(12) United States Patent
Grunwald et al.

(10) Patent No.: US 7,458,246 B2
(45) Date of Patent: Dec. 2, 2008

(54) METHOD FOR FUNCTIONALLY TESTING A FILLING LEVEL SENSOR

(75) Inventors: Oliver Grunwald, Hockenheim (DE); Matthias Wiese, Frankfurt (DE)

(73) Assignee: Siemens Aktiengesellschaft, Munich (DE)

( * ) Notice: Subject to any disclaimer, the term of this patent is extended or adjusted under 35 U.S.C. 154(b) by 494 days.

(21) Appl. No.: 11/236,093

(22) Filed: Sep. 27, 2005

(65) Prior Publication Data

US 2006/0065040 A1 Mar. 30, 2006

(30) Foreign Application Priority Data

Sep. 27, 2004 (DE) ........................ 10 2004 046 780

(51) Int. Cl.
 *G01F 25/00* (2006.01)
(52) U.S. Cl. ........................ 73/1.73; 702/116
(58) Field of Classification Search .................. 73/1.73, 73/292; 702/100, 116
 See application file for complete search history.

(56) References Cited

U.S. PATENT DOCUMENTS

| | | | | |
|---|---|---|---|---|
| 3,152,478 | A | * | 10/1964 | Hughes et al. ................. 73/308 |
| 3,797,311 | A | * | 3/1974 | Blanchard et al. ........ 73/1.73 X |
| 4,672,842 | A | | 6/1987 | Hasselmann |
| 4,716,536 | A | * | 12/1987 | Blanchard .................... 702/100 |
| 4,796,469 | A | | 1/1989 | Brown et al. |
| 4,811,601 | A | * | 3/1989 | Tolan ........................ 73/290 B |
| 5,069,068 | A | * | 12/1991 | Jacob et al. .................... 73/313 |
| 5,075,877 | A | * | 12/1991 | Jacob et al. ............... 73/292 X |
| 5,259,673 | A | * | 11/1993 | Christopher ................. 374/43 |
| 5,402,110 | A | | 3/1995 | Oliver et al. |
| 5,979,233 | A | * | 11/1999 | Johnson .................... 73/1.73 X |
| 6,401,045 | B1 | * | 6/2002 | Rogers et al. ........... 702/100 X |
| 6,712,503 | B2 | * | 3/2004 | Lin et al. ....................... 374/45 |
| 7,258,483 | B2 | * | 8/2007 | Heldberg .................. 73/292 X |

FOREIGN PATENT DOCUMENTS

| | | | | |
|---|---|---|---|---|
| DE | 83 31 743 U1 | | 2/1984 | |
| DE | 4028095 A1 | * | 3/1991 | .................. 356/72 |
| DE | 44 29 234 A1 | | 8/1995 | |
| EP | 39420 B | * | 1/1986 | |
| JP | 53087760 A | * | 8/1978 | .................. 73/292 |
| JP | 63168514 A | * | 7/1988 | |
| JP | 03291531 A | * | 12/1991 | ................. 73/1.73 |
| JP | 04332825 A | * | 11/1992 | .................. 73/292 |
| RU | 2069317 C1 | * | 11/1996 | |

* cited by examiner

*Primary Examiner*—Thomas P Noland
(74) *Attorney, Agent, or Firm*—Baker Botts L.L.P.

(57) ABSTRACT

The invention relates to a method for functionally testing a filling level sensor which measures the filling level of a liquid in a tank, in which method a change in filling level that is measured by the filling level sensor is compared with a calculated change in filling level. According to the invention, the calculated change in filling level is determined from a measured change in temperature of the liquid.

9 Claims, 1 Drawing Sheet

METHOD FOR FUNCTIONALLY TESTING A FILLING LEVEL SENSOR

CROSS REFERENCE TO RELATED APPLICATION

This application claims priority of the German application No. 10 2004 046 780.3 DE filed Sep. 27, 2004, which is incorporated by reference herein in its entirety.

FIELD OF THE INVENTION

The invention relates to a method for functionally testing a filling level sensor which measures the filling level of a liquid in a tank, in which method a change in filling level that is measured by the filling level sensor is compared with a calculated change in filling level.

BACKGROUND OF THE INVENTION

Such a method is used, for example, in present-day motor vehicles in order to check the filling level sensor in a fuel tank, the measured change in filling level being compared with a value which is calculated from the amount of fuel which has been consumed and thus has been taken from the tank. To this end, during normal operation of the internal combustion engine which consumes the fuel, a first filling level value is measured and a timer (counter) is then started. A second filling level value is measured after the timer has timed out. While the timer is being started up, a model of the operating behavior of the internal combustion engine is used to determine the amount of fuel consumed. If the change in filling level determined from the difference between the first filling level value and the second filling level value matches the change in filling level derived from the amount of fuel consumed, the filling level sensor is classified as being correctly functional.

DE-8331743-U1 discloses another method for checking the functionality of a filling level sensor that functions as a limit-value transmitter. In that case, compressed air is used to generate an air bubble which pushes the liquid to be measured out of the measurement range of the filling level sensor, with the result that the sensor indicates that the filling level has been undershot.

SUMMARY OF THE INVENTION

The object of the present invention is to specify an alternative method for functionally testing a filling level sensor.

This object is achieved by means of a method (mentioned initially) in which the calculated change in filling level is determined from a measured change in temperature of the liquid.

The invention is based on the fundamental consideration that it is possible for a change (which is to be indicated by a filling level sensor) in the filling level to not only occur on account of liquid being removed or on account of liquid being displaced by means of air but also on account of a temperature-induced change in the volume of the liquid. Such a temperature-induced change in volume may be calculated directly from the measured change in temperature and converted into a corresponding change in filling level, and the calculated change in filling level is compared with the change in filling level measured by the filling level sensor.

Such a method can be implemented in a simple manner since only one temperature sensor is required. The method can also be carried out in a simple manner since only a few measurement steps and computational operations are required. In contrast to the known methods, this results in the advantage that it is not necessary to either calculate a complex model of liquid removal or fit a complex measuring arrangement for introducing compressed air to the tank.

In one preferred development of the invention, the measured change in filling level is converted into a measured change in volume which is compared with a change in volume that has been calculated from the change in temperature. Since it is already customary in many applications for the filling level measured by the filling level sensor not to be output directly as level information but rather to be converted into a filling volume, this conversion is also used during functional checking in order to simplify the method according to the invention. Particularly in the case of tanks having a variable cross section, in which a uniform change in volume therefore leads to different changes in filling level, it is more convenient for a person observing the values which are determined during functional testing to have said values displayed in units of volume such as liters or cubic centimeters.

In one development of the invention, the measured change in filling level and the change in temperature are recorded over a period of time in which no liquid is taken from the tank. This ensures that the change in filling level observed in the tank can be exclusively attributed to changes in temperature. There is thus no need to additionally monitor whether liquid is removed at the same time and to accordingly terminate functional testing or to take the removal of liquid into account when calculating the change in filling level, thus simplifying functional testing overall.

In another refinement of the invention, the measured change in filling level and the change in temperature are recorded over a period of time in which the physical position of the tank is not changed. Such a change in position occurs, in particular, in moving motor vehicles such as land vehicles, ships or aircraft in which, on account of the motor vehicle moving, the fuel in the tank also starts to move, with the result that, under certain circumstances, a filling level sensor that is secured to a wall of the tank container indicates a change in filling level even though the volume of fuel has not changed at all. In order to avoid monitoring for any possible change in physical position and thus to keep functional testing as simple as possible, the change in filling level and the change in temperature are therefore measured exclusively, in this refinement, when there is no change in position.

In another refinement of the invention, the measured change in filling level is compared with the calculated change in filling level only when the change in temperature has exceeded a prescribed threshold value.

This ensures that a sufficiently large change in temperature also gives rise to a sufficiently large change in volume that exceeds the measurement inaccuracy of the filling level sensor. The reliability of functional testing is thus increased.

In one particular refinement of the method according to the invention, the liquid is a fuel for supplying an internal combustion engine, and the measured change in filling level and the change in temperature are recorded over a period of time which begins after the internal combustion engine has been switched off and ends after the internal combustion engine has been switched on again.

The advantage of this refinement is the fact that, in most cases, a fuel which is heated during operation of the internal combustion engine will cool down considerably after the internal combustion engine has been switched off and before it is next switched on again. It is thus ensured, with a high degree of probability, that the requisite minimum threshold of the change in temperature will be exceeded. In addition, the internal combustion engine will not require any fuel whatsoever from the tank after it has been switched off, that is to say removal of fuel is excluded. The tank will normally no longer be moved either until the internal combustion engine is switched on again, with the result that it can be assumed that the physical position of the tank remains the same.

BRIEF DESCRIPTION OF THE DRAWINGS

The invention will be explained in more detail below with reference to an exemplary embodiment and the drawing, in which.

DETAILED DESCRIPTION OF THE INVENTION

Figure 1:
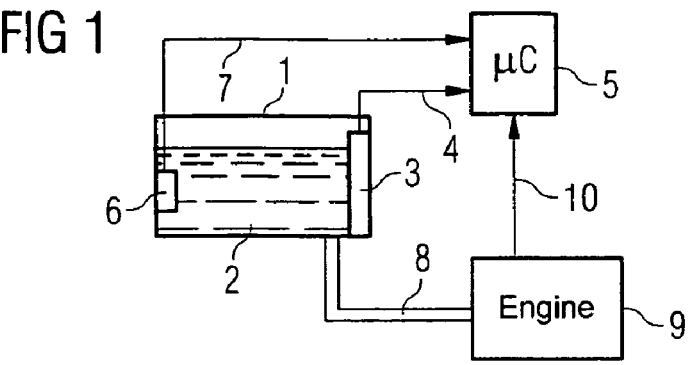
FIG. 1 shows an arrangement for functionally testing a filling level sensor.

FIG. 1 illustrates a tank 1 which contains a fuel in the form of a liquid 2. A filling level sensor 3 supplies a filling level signal 4 to a computation unit 5. In addition, a temperature sensor 6 transmits a temperature signal 7 to the computation unit 5. An internal combustion engine 9 is supplied with fuel via a fuel line 8. The current switched-on or switched-off state of the internal combustion engine 9 is supplied to the computation unit 5, as a third input variable, in the form of the state signal 10.

Figure 2:
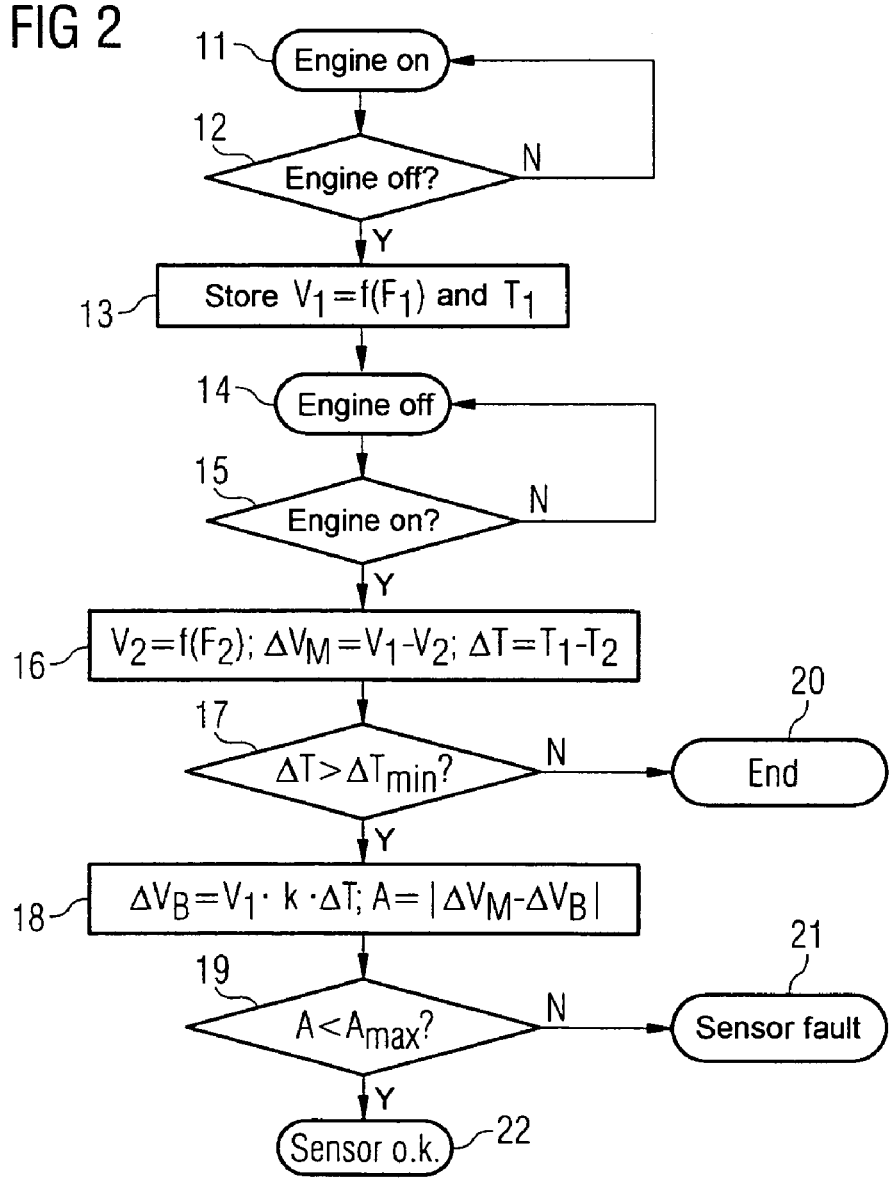
FIG. 2 shows a functional testing flowchart.

The functionality of the filling level sensor 3 in the tank 1 is tested using the steps illustrated in FIG. 2, the method proceeding in the computation unit 5. If the state signal 10 indicates that the internal combustion engine 9 has been switched off, that is to say if, starting from the switched-on state 11, the question 12 regarding the switched-off state of the internal combustion engine 9 is answered in the affirmative, the current value of the filling level signal 4 is recorded as a first filling level value $F_1$ and the current value of the temperature signal 7 is recorded as a first temperature value $T_1$. In step 13, a first volume value $V_1$ is determined from the first filling level value $F_1$ using, for example, a data table $f(F_1)$, in which the associated volume values are assigned to the individual filling level values, or a calculation formula $f(F_1)$. The first volume value $V_1$ therefore specifies the volume of liquid 2 at the point in time at which the internal combustion engine 9 is switched off. The first volume value $V_1$ and the first temperature value $T_1$ are also stored in a data memory of the computation unit 5 in step 13.

If the state signal 10 then indicates that the internal combustion engine has been switched on again, that is to say if, starting from state 14, the question 15 is answered in the affirmative, the current values of the filling level signal 4, as second filling level value $F_2$, and of the temperature signal 7, as second temperature value $T_2$, are recorded and processed further in step 16. The second filling level value $F_2$ is again converted into a second volume value $V_2$. The difference between the first volume value $V_1$ and the second volume value $V_2$ is calculated and the measured change in volume $\Delta V_M$ is thus determined:

$$\Delta V_M = V_1 - V_2. \tag{1}$$

The change in temperature $\Delta T$ is also determined using the difference between the first and second temperature values:

$$\Delta T = T_1 - T_2. \tag{2}$$

In step 17, the change in temperature $\Delta T$ is compared with a minimum threshold $\Delta T_{min}$. If the change in temperature $\Delta T$ is greater than the minimum threshold $\Delta T_{min}$, functional testing of the filling level sensor 2 is continued, that is to say a changeover to step 18 is carried out. Otherwise, functional testing is ended without a result with state 20.

It is now assumed that the volume of liquid 2 changes linearly with the change in temperature $\Delta T$. The equation $$\Delta V_B = V_1 * k * \Delta T \tag{3}$$

is used in step 18 to determine the calculated change in volume $\Delta V_B$, the factor k being the cubic coefficient of expansion of the liquid 2.

Finally, the measured change in volume $\Delta V_M$ and the calculated change in volume $\Delta V_B$ are compared with one another, the difference A between $\Delta V_M$ and $\Delta V_B$ being calculated for this purpose in step 18

$$A = |\Delta V_M - \Delta V_B| \tag{4}$$

Question 19 is used to check whether the difference A is below a maximum threshold $A_{max}$. If this is the case, the filling level sensor is assessed as being functional with state 22. Otherwise a fault message 21 indicating that the filling level sensor is defective is generated.

The invention claimed is:

1. A method for functionally testing a filling level sensor that measures a filling level of a liquid in a tank;
   measuring a change in the filling level that is measured by the filling level sensor;
   comparing the change in the filling level with a calculated change in filling level; and
   determining the calculated change in filling level from a measured change in temperature of the liquid, wherein the liquid is a fuel for supplying an internal combustion engine, and the measured change in filling level and the change in temperature are recorded over a period of time that begins after the internal combustion engine has been switched off and ends after the internal combustion engine has been switched on again.

2. The method as claimed in claim 1, wherein the measured change in filling level is converted into a measured change in volume which is compared with a change in volume that has been calculated from the change in temperature.

3. The method as claimed in claim 2, wherein the measured change in filling level and the change in temperature are recorded over a period of time in which no liquid is taken from the tank.

4. The method as claimed in claim 2, wherein the measured change in filling level and the change in temperature are recorded over a period of time in which the physical position of the tank is not changed.

5. The method as claimed in claim 1, wherein the measured change in filling level and the change in temperature are recorded over a period of time in which no liquid is taken from the tank.

6. The method as claimed in claim 5, wherein the measured change in filling level and the change in temperature are recorded over a period of time in which the physical position of the tank is not changed.

7. The method as claimed in claim 6, wherein the measured change in filling level is compared with the calculated change in filling level only when the change in temperature has exceeded a prescribed threshold value.

8. The method as claimed in claim 1, wherein the measured change in filling level and the change in temperature are recorded over a period of time in which the physical position of the tank is not changed.

9. The method as claimed in claim 1, wherein the measured change in filling level is compared with the calculated change in filling level only when the change in temperature has exceeded a prescribed threshold value.

* * * * *